United States Patent
Roorda et al.

(10) Patent No.: US 11,755,921 B2
(45) Date of Patent: Sep. 12, 2023

(54) MACHINE LEARNING MODULE FOR A DIALOG SYSTEM

(71) Applicant: INTERNATIONAL BUSINESS MACHINES CORPORATION, Armonk, NY (US)

(72) Inventors: Stephan Joseph Roorda, Fuquay-Varina, NC (US); Miroslav Vodolán, Vlašim (CZ); Josef Ondrej, Zubří (CZ); Martin Labsky, Prague (CZ)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 17/034,425

(22) Filed: Sep. 28, 2020

(65) Prior Publication Data

US 2021/0097979 A1    Apr. 1, 2021

(30) Foreign Application Priority Data

Sep. 30, 2019  (EP) .................................... 19200335

(51) Int. Cl.
*G06N 3/091*    (2023.01)
*G06N 3/088*    (2023.01)
(Continued)

(52) U.S. Cl.
CPC ............. *G06N 3/088* (2013.01); *G06F 18/22* (2023.01); *G06F 18/23* (2023.01); *G06N 20/00* (2019.01);
(Continued)

(58) Field of Classification Search
USPC .......... 704/1–275; 705/26.1–27.1; 706/1–62; 714/1–57, 100; 715/700–752
See application file for complete search history.

(56) References Cited

U.S. PATENT DOCUMENTS

| 7,529,667 | B1 | 5/2009 | Gorin |
| 7,885,817 | B2 | 2/2011 | Paek |

(Continued)

FOREIGN PATENT DOCUMENTS

GB    2571199 A    8/2019

OTHER PUBLICATIONS

WO 2017/199074, Srinivas Naveen; Method of Generating Knowledge Based Data and an Embedded Cognitive Processing System Thereof; Nov. 23, 2017 (Year: 2017).*

(Continued)

*Primary Examiner* — Marcellus J Augustin
(74) *Attorney, Agent, or Firm* — Anthony M. Pallone

(57) ABSTRACT

The present disclosure relates to a method for a dialog system. The method comprises: receiving a user input at the dialog system. A machine learning module may receive from the dialog system a dialog system response to the user input. In response to determining that the machine learning module is in a deactivated mode, selected one or more training data items of the dialog system response and the user input may be used for training the machine learning module. In response to determining that the machine learning module is in an active mode the trained machine learning module may estimate from the set of output data items and the user input a machine learning module response to the user input. The machine learning module response or the dialog system response may be provided.

18 Claims, 8 Drawing Sheets

(51) Int. Cl.
  *G06N 20/00* (2019.01)
  *G10L 15/06* (2013.01)
  *G10L 15/22* (2006.01)
  *G06F 18/22* (2023.01)
  *G06F 18/23* (2023.01)

(52) U.S. Cl.
  CPC ............ *G10L 15/063* (2013.01); *G10L 15/22* (2013.01); *G10L 2015/0631* (2013.01); *G10L 2015/223* (2013.01)

(56) References Cited

U.S. PATENT DOCUMENTS

| | | | |
|---|---|---|---|
| 8,543,401 B2 | 9/2013 | Suendermann | |
| 9,741,336 B2 | 8/2017 | Williams | |
| 10,740,371 B1* | 8/2020 | Mars | G06N 5/04 |
| 11,210,583 B2* | 12/2021 | Mathew | G06N 20/00 |
| 11,581,069 B2* | 2/2023 | Tommasi | G06N 20/00 |
| 2006/0206337 A1 | 9/2006 | Paek | |
| 2014/0309993 A1 | 10/2014 | Goussard | |
| 2017/0213274 A1 | 7/2017 | Vijayaraghavan | |
| 2017/0322923 A1 | 11/2017 | Dixon et al. | |
| 2018/0157721 A1 | 6/2018 | Khaitan | |
| 2019/0147853 A1 | 5/2019 | Gunasekara et al. | |
| 2019/0171646 A1 | 6/2019 | Chu-Carroll et al. | |
| 2019/0188590 A1 | 6/2019 | Wu | |
| 2019/0361961 A1* | 11/2019 | Zambre | G06F 3/0482 |
| 2020/0150601 A1* | 5/2020 | Valpola | G06N 3/045 |
| 2020/0250382 A1* | 8/2020 | Mars | G06F 16/3329 |

OTHER PUBLICATIONS

Guo et al., "Conversational Bootstrapping and Other Tricks of a Concierge Robot", HRI '17, Mar. 6-9, 2017, pp. 73-81.

International Search Report and Written Opinion for International Application No. PCT/IB2020/057463, International Filing Date Aug. 7, 2020, dated Nov. 9, 2020, 11 pages.

* cited by examiner

MACHINE LEARNING MODULE FOR A DIALOG SYSTEM

BACKGROUND

The present invention relates to the field of digital computer systems, and more specifically, to a method for a dialog system.

The most common way of authoring dialog agents, such as chat bots and voice bots, is to build rules that determine how the bot responds to user inputs, given a conversation context. One way of representing such rules is to author dialog node trees. The communication of the end user with the agent is then realized via traversing the nodes in the dialog tree, which happens based on recognizing intents and entities for every user input in a conversation. The intents are recognized based on predefined designer examples. However, the agent remains limited to these designer examples and its behaviour stays basically the same over time.

SUMMARY

Various embodiments provide a method for a dialog system, machine leaning module, and computer program product as described by the subject matter of the independent claims. Advantageous embodiments are described in the dependent claims. Embodiments of the present invention can be freely combined with each other if they are not mutually exclusive.

In one aspect, the invention relates to a method for a dialog system. The method includes providing a machine learning module, the machine learning module being configured to operate in an active mode and a deactivated mode. The method includes receiving a user input at the dialog system. The method includes receiving at the machine learning module from the dialog system a dialog system response to the user input. The dialog system response includes a set of output data items. In response to determining that the machine learning module is in the deactivated mode, the method includes using selected one or more training data items of the set of output data items and the user input for training the machine learning module. In response to determining that the machine learning module is in the active mode, the method includes estimating by the trained machine learning module from the set of output data items and the user input a machine learning module response to the user input. The method includes providing the machine learning module response in the active mode or the dialog system response in the deactivated mode.

In another aspect, the invention relates to a dialog leaning module for a dialog system. The dialog leaning module is configured for: receiving from the dialog system a dialog system response to a user input, the dialog system response including a set of output data items; in response to determining that the machine learning module is in the deactivated mode, using selected one or more data items of the set of output data items and the user input for training the machine learning module; in response to determining that the machine learning module is in the active mode, estimating by the trained machine learning module from the set of output data items and the user input a machine learning module response to the user input; and providing the machine learning module response or the dialog system response.

In another aspect, the invention relates to a dialog system comprising the dialog machine learning module.

In another aspect, the invention relates to a computer program product comprising a computer-readable storage medium having computer-readable program code embodied therewith, the computer-readable program code configured to implement all of steps of the method according to preceding embodiments.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
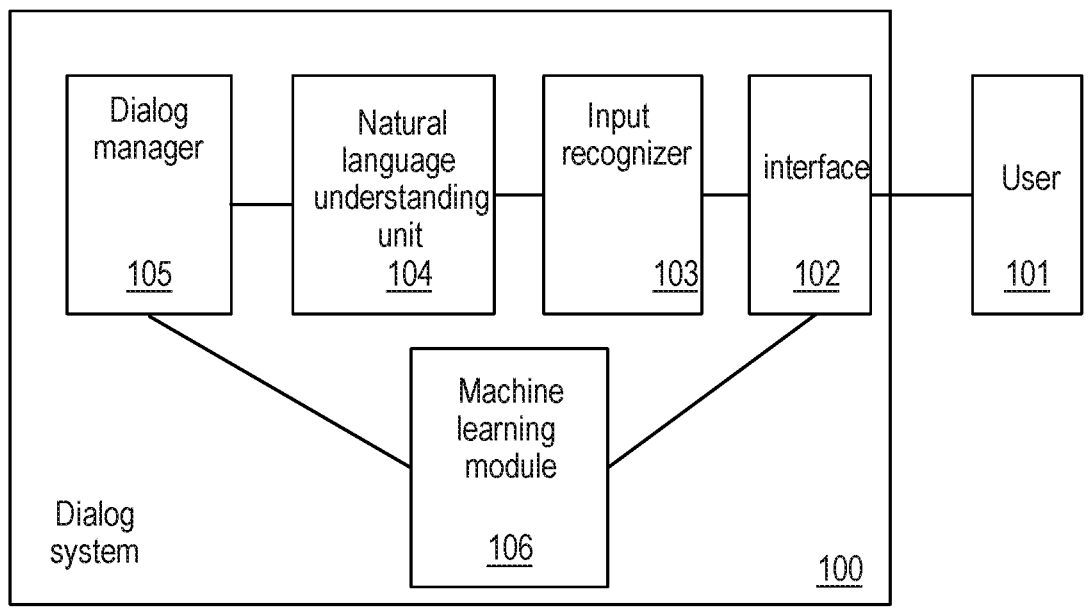
FIG. 1 depicts a diagram of a dialog system in accordance with an example of the present subject matter.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present subject matter may enable to automatically update a dialog system behavior based on interactions with end users. This may particularly be advantageous as it may not rely on designer examples. In particular, a dialog system configured by the present subject may not rely on a designer input only. This may be advantageous as the designer of a dialog system may forget to provide examples for some intents or the designer does not provide enough examples for some intents, or the designer provides very similar examples for two different intents.

The present subject matter may save processing resources of dialog systems as it may reduce user interactions with the dialog system e.g. unnecessary user interactions due to inaccurate responses may be prevented or reduced. This may particularly be advantageous as dialog systems may be used by a sheer number of users.

The present subject matter may enable an automatic learning technique to enhance the functionality of the dialog system based on interactions with its end users. The present subject matter may leverage already existing disambiguation features such as existing disambiguation features of Watson Assistant to learn clicking for the user. Clicking for the user means that the machine learning module automatically selects a data item of the dialog system response instead of the user doing that, wherein said user selection may be a click performed by the user on a link representing the selected data item on a display device.

A data item of the output data items may for example comprise a text e.g. the data item may comprise one or more words. The data item may be referred to as an action. The user input may by referred to as an observation.

The machine learning module may be certain or uncertain about a response of a user input. The machine learning module may be certain if it can select one data item of the set of output data items that corresponds to the user input; otherwise it is uncertain. If the machine learning module is uncertain it may use a disambiguation feature of the machine learning module. Using the disambiguation feature comprises providing the set of output data items of the dialog system response.

According to one embodiment, the method further comprises switching from the deactivated mode to the active mode in response to determining that the machine learning module is trained with a minimum amount of data and/or estimations of the machine learning module have an accuracy higher than a predefined threshold.

According to one embodiment, the method further comprises switching from the active mode to the deactivated mode in response to determining that estimations of the machine learning module have an accuracy smaller than the predefined threshold or for further training the machine learning module.

For example, while being in the active mode, the machine learning module may be monitored e.g. by a model monitor, to check its accuracy. This monitoring may be independent of the machine learning module and can be used to force the machine learning module to step down from clicking for the user and make it train instead. The monitoring may be advantageous as the estimation accuracy or quality by the machine learning module may deteriorate over time. The estimation accuracy may deteriorate for several reasons e.g. the dialog system may change the way it generates the dialog system responses or there is a seasonal shift in what end users are asking.

These embodiments may enable an autonomous and continuous monitoring of the machine learning module that can automatically be activated/de-activated based on its performance. This allows the dialog system to run fully automated (with no supervision) while the machine learning module is being trained in real time or being used in an active mode.

According to one embodiment, the method further comprises for each received user input of a set of test user inputs: estimating by the machine learning module a machine learning module test response to the user input; determining by the dialog system a dialog system test response to the user input; comparing the machine learning module test response with a user selected output data item of the dialog system test response; determining the accuracy based on the set of comparison results.

The machine learning module may be configured to receive a group of user inputs for which the machine learning module may generate machine learning module responses, wherein the machine learning module is certain about that responses. The machine learning module may be certain about a response if a confidence value indicative of the confidence in the estimation of the response is higher than a confidence threshold. A portion of the group of user inputs and corresponding generated machine learning module responses may be used to check the performance or correctness of the responses. This portion of the group of user inputs is the set of test user inputs. The portion may be a randomly chosen portion of the group. In another example, the portion comprises user inputs received at predefined times e.g. user inputs received at a specific hour of every day may be used as test user inputs. For each test user input, the machine learning module may prompt the user with the set of output data items of the test user input so that the user can select one data item that can be compared with the machine learning module response. In other words, even if the machine learning module is certain, it does not always click for the user and in some percentage of cases it shows the disambiguation options anyway, even when the machine learning module is certain about the response to pick.

This embodiment defines an example of how the monitoring is performed in order to check the performance of the machine learning module.

According to one embodiment, the method further comprises in case the set of output data items comprises more than one data item receiving from the user a selection of the one or more training data items; wherein in case the set of output data items comprises a single data item, the selected training data item is the single data item.

For example, the user may be prompted to select the one or more training data items from the set of output data items. This may enable a real-time training of the machine learning module. For example, users can "bootstrap" the machine learning module with as little as a single utterance per intent and the machine learning module can further improve through interactions, where initially it will disambiguate (i.e. use the disambiguation feature) frequently and gradually learn to disambiguate less.

According to one embodiment, the estimating comprises using the user input for selecting a data item of the set of output data items or ranking the set of output data items. The machine learning module response comprises the selected data item or the ranked data items. The machine learning module enables to refine the suggested response by the dialog system. By ranking the set of output data items, the reaction of the user may be faster compared to displaying a randomly ordered set of data items. This may save processing time of dialog systems and shorten their response time. The ranking of the set of output data items may be performed using scores assigned to the set of output data items. The score of a data item may for example be a confidence level of the machine learning module in the estimated data item.

According to one embodiment, the using of the selected one or more training data items of the set of output data items and the user input for training the machine learning module is performed in case the selected one or more training data items were previously selected a number of times for said user input.

For example, the user input comprises the sentence "I am missing my credit card" and the dialog system response may comprise a set of output data items comprising the following three statements "Stolen Card", "Card Not Delivered" and "None of the above". The user may select the data item "Stolen Card". And, since 95% of all users selected the data item "Stolen Card" when they use the same user input "I am missing my credit card", the data item "Stolen Card" may be used in accordance with this embodiment for the training.

This may be advantageous in case a majority of end users who uttered similar user inputs, in similar conversation contexts, clicked or selected the same response option. This may provide a reliable and accurate training of the machine learning module. An accurate machine learning module may further improve the performance of the dialog system e.g. by further saving processing resources compared to an inaccurate module.

According to one embodiment, the method further comprises building a training set. The building comprises adding the pair of the machine learning module response and user input to the training set in the active mode, and adding the selected one or more training data items of the set of output data items and the user input to the training set in the deactivated mode, wherein the training is performed using the training set. Building the training set in both modes of operation may enable a coherent content of the training as there is no gaps in time between the data of the training set. This may enable an accurate training compared to using inhomogeneous set of data.

According to one embodiment, the training is performed if the training set has a minimum number of pairs.

According to one embodiment, the method further comprises performing a text pre-processing of the user input. The text pre-processing comprises at least changing the format of the user input.

According to one embodiment, the machine learning module comprises a clustering algorithm. The training of the machine learning module results in clusters of the pairs. This may enable an unsupervised learning of the machine learning module.

According to one embodiment, the estimating comprises: identifying a cluster of the clusters that corresponds to the user input; for each output data item of the set of output data items: determining if an object of the identified cluster comprises the output data item, the object being a pair of the cluster; scoring the output data item dependent on the determined objects; selecting one or more data items of the set of output data items having a score higher than a predefined score threshold. The machine learning module response comprises the one or more selected data items.

According to one embodiment, the identifying comprises determining a similarity value indicative of a similarity between the user input and a centroid object of each cluster of the clusters, wherein the cluster corresponding to the user input is the cluster having the similarity value fulfilling a similarity criterion.

According to one embodiment, the similarity value is a Jaccard distance between the user input and the centroid object. The similarity criterion may for example requires that the Jaccard distance is smaller than a predefined distance threshold.

According to one embodiment, in case that no cluster of the clusters corresponds to the user input, the machine learning module response comprises the set of output data items. This may indicate that the machine learning module cannot produce a reliable answer and thus the set of output data items suggested by the dialog system may be provided to the user so that the user can select one of them.

According to one embodiment, the dialog system is configured to provide the result of the user input using a dialogue tree.

According to one embodiment, the user input is a text input and/or speech input.

FIG. 1 depicts a diagram of a dialog system 100 in accordance with an example of the present subject matter. The dialog system 100 may be configured to receive a user input (e.g. an utterance) of a user 101 and to respond to the user input. The user input may be a user query. The term "user" may refer to an entity e.g., an individual, a computer, or an application executing on a computer. The user input may be received as a text, speech, graphics, haptics, gestures, or other modes for communication that enables the dialog system to process the user input in accordance with the present subject matter. The response to the user input may comprise one or more data items. A data item of the response may for example be provided as a text or speech or other means that enables the user 101 to access the response.

The dialog system 100 may be configured to receive the user input via an interface 102 of the dialog system 100. The dialog system 100 comprises an input recognizer 103. The input recognizer 103 may for example be a speech recognizer or handwriting recognizer etc. The user input received at the interface 102 may be converted by the input recognizer 103 to a text e.g. plain text. For example, if the user input is a speech, the input recognizer 103 may process the sound from the speech so that the speech may be recognized and converted into text.

The text is processed by a natural language understanding unit 104 of the dialog system 100 in order to generate semantic information. For example, the natural language understanding unit 104 may extract words from the text to understand the grammar dependencies to construct the semantic information, wherein the semantic information identifies an underlying intent and entity in the user input. An intent may be the ultimate user's goal behind his or her user input. The intent may be defined by a name or class e.g. the semantic information may comprise a string indicating the intent. An entity may be a label word that gives a certain sentence a distinctive or a special meaning. The user input may comprise words that have a value of one or more entities e.g. the word "Frankfurt" may be a value of an entity called "city" and "3" may be a value of an entity called "natural number".

The natural language understanding unit 104 may, for example, be trained using user examples. The user examples may comprise sentences as examples of possible user inputs that should be recognized as the intent (and entity) at hand by the natural language understanding unit 104. For example, a first user example may comprise an intent "#stolen_credit_card" in association with user inputs "My credit card was stolen" and "I am missing my credit card". A second user example may comprise an intent "#credit_card_not_delivered" in association with inputs "My new credit card was not yet delivered" and "I am missing my credit card". The intent of the first user example may handle customers whose credit card was stolen or who lost it. The intent of the second user example may handle cases when a new credit card was not delivered in time. The two user examples have similar user inputs associated with the intents. That is, if the user input "I am missing my credit card" is received at the natural language understanding unit 104, the dialog system response may comprise at least two data items comprising for example "#stolen_credit_card" and "#credit_card_not_delivered".

The semantic information may, for example, be processed by a dialog manager 105 of the dialog system 100. The dialog manager 105 may be configured to keep the history and state of the dialog and manages the general flow of the conversation. By processing the sematic information, the dialog manager 105 may produce a dialog system response to the received user input. The dialog manager 105 may be configured to use a dialog tree to provide the dialog system response. The dialog tree may be a set of nodes that represent possible stages of a conversation between the user 101 and the dialog system 100. The dialog tree may represent a topic type or context of a communication between the dialog system 100 and the user 101 and the actions the dialog manager may use to clarify or respond to the user input. The dialog system response comprises a set of one or more output data items.

The set of one or more output data items and the semantic information (or the user input) may, for example, be provided as input to a machine leaning module 106. The machine learning module 106 may be referred to as an auto learn model. The machine learning module 106 is shown as being part of the dialog system 100; however, it is not limited to, and the machine learning module 106 may be remotely connected to the dialog system e.g. via a network. The machine learning module 106 may be configured to operate in an active mode of operation or a deactivated mode of operation. The machine learning module 106 may be trained or further trained if it is in the deactivated mode. The machine learning module 106 in the active mode may be a trained machine learning module. If the machine learning module 106 is in the active mode at the time of receiving the set of one or more output data items, the machine learning module 106 may produce a machine learning module response to the user input. An output generator (not shown) of the dialog system 100 may be configured to output the dialog system response and/or the machine learning module response.

Figure 2:
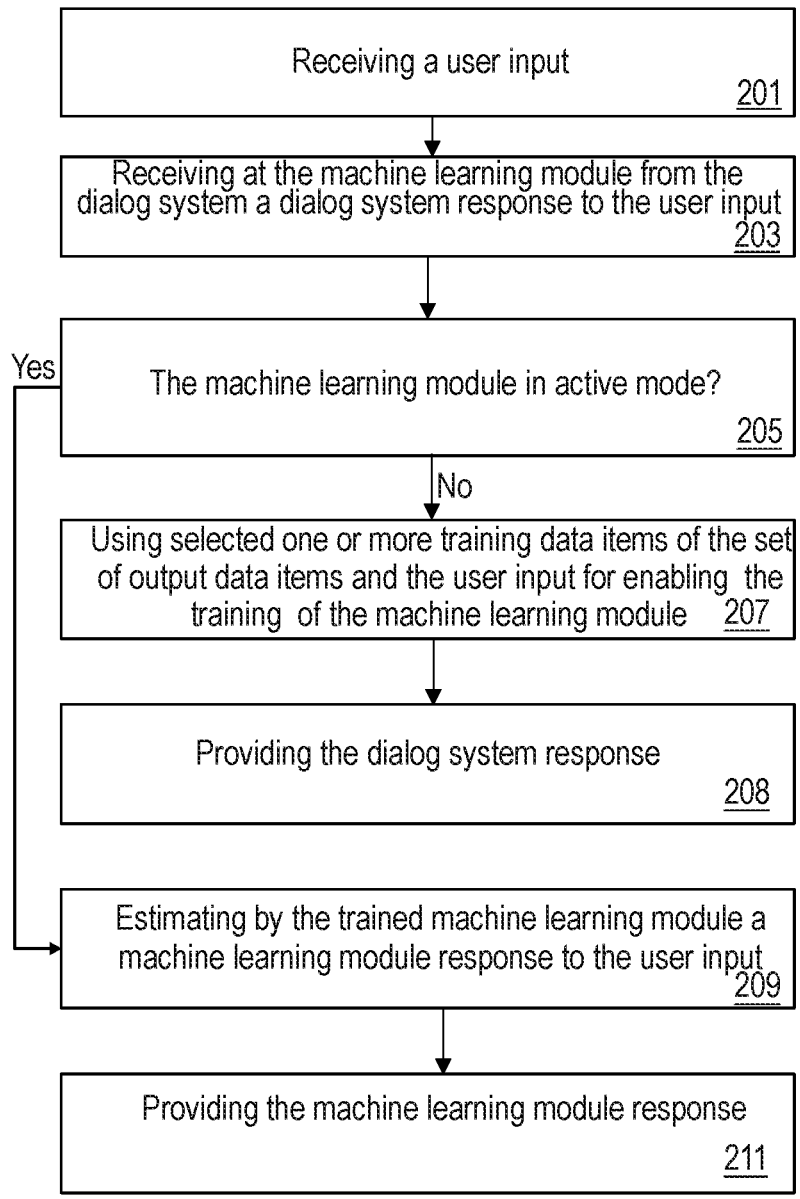
FIG. 2 is a flowchart of a method for operating a dialog system in accordance with an example of the present disclosure.

FIG. 2 is a flowchart of a method for operating a dialog system. For the purpose of explanation, the method described in FIG. 2 may be implemented in the dialog system 100 illustrated in FIG. 1, but is not limited to this implementation. The method of FIG. 2 may be configured to operate with other dialog systems that each provide a dialog system response in response to a user input.

A user input may be received in step 201 at the dialog system 100. The user input may be received from a user of the dialog system 100. The user may be interacting with the dialog system 100 in order to communicate to the dialog system a question or statement. The user input may be a text, speech, scanned documents, images, etc. The information about the user input may be contained in the user input itself. The user input may comprise an unstructured language. The user input may have a grammar. The grammar may for example describe how the words in the user input relate to each other. The dialog system may generate a dialog system response to the user input. The dialog system response may use semantic information of the user input. The semantic information may comprise an underlying one or more intents and entities in the user input.

For example, if the user input comprises the sentence "I am missing my credit card", the dialog system response may comprise a set of output data items comprising the following three statements "Stolen Card", "Card Not Delivered" and "None of the above". This may provide multiple possible answers to the user input and may be referred to as a disambiguation feature of the dialog system 100. The disambiguation feature may be used in case the dialog system is not sure about which intent to select for the user input. In this case, the dialog system 100 may provide multiple possible answers as a response to the user input.

The present subject matter may enable to enhance the operation of the dialog system by "helping" the dialog system to identify a most likely response to the user input based on the set of output data items. For that, a machine learning module e.g. 106 may receive in step 203 from the dialog system the dialog system response. Depending on the operation mode of the machine learning module 106, the dialog system response may be used accordingly.

It may be determined, at step 205, if the machine learning module is in the active mode or in the deactivated mode of operation.

In response to determining that the machine learning module is in the deactivated mode, selected one or more training data items of the received dialog system response and the associated user input may be used for enabling a training of the machine learning module in step 207. For example, the training of the machine learning module may be performed using a training set. The training set may for example comprise multiple objects. Each object of the objects comprises a pair of one or more output data items and corresponding user input. The using step 207 may comprise enhancing or augmenting the training set by a new pair (object) of the selected one or more training data item and the received user input. The training may for example be performed upon adding the new pair in step 207. In one example, the training may be performed if the number of pairs present in the training set is higher than a predefined minimum number of pairs. In other terms, the machine learning module 106 may learn to choose the right answer for the user 101. If the machine learning module is in the deactivated mode, the dialog system response may, for example, be provided in step 208.

In response to determining that the machine learning module is in the active mode, the trained machine learning module may estimate in step 209 from the set of output data items and the user input a machine learning module response to the user input. In other words, the machine learning module may choose, if possible, for the user 101 which answer of the dialog system response corresponds to the user input.

The machine learning module 106 may estimate the machine learning module response based on what it learned from the training set. For example, the machine learning module may be trained using a supervised learning technique so that it can classify or map one output data item of multiple output data items of the dialog system response to the user input. The machine learning module may select one data item of the dialog system response as the machine learning module response. If the machine learning module 106 may not be able to decide which data item of the dialog system response corresponds to the user input, a machine learning module disambiguation feature may be used so that the set of output data items of the dialog system response may be provided as the machine learning module response. In one example, the set of output data items may be ranked and the resulting ranked set of output data items may be provided as the machine learning module response in accordance with the disambiguation feature. The machine learning module response may be provided in step 211. In another example, the machine learning module may comprise a neural network that is trained using vectors of numbers representing the pairs of the training set. The vector of numbers may be provided in accordance with a predefined sentence or word to vector algorithm. Each pair of the training set may comprise a set of one or more output training data items and associated user input. The pair may be represented by two vectors, one vector representing the set and another vector representing the user input. In the application stage of the trained machine leaning module, the machine learning module response may be predicted as follows. A first vector of numbers of a fixed size may be assigned to a set of output data items (output data items would be for example 'Premium Card', 'Card Lost' as in the FIG. 3B). The first vector of numbers may be provided in accordance with the predefined sentence or word to vector algorithm. And a user input associated with the set (which would be for example the utterance "i am missing my card") may be converted into a second vector of numbers using the sentence to vector algorithm. The first and second vectors may be input into the neural network which may output a single number that indicates how likely is a data item of the set is a corresponding answer to the user input. These single numbers may be used to provide a list of top data items of the set that would match the user input.

Thus, according to the method of FIG. 2 the machine learning module may for example receive a user's utterance and a list of suggestions as input and the machine learning module outputs either one of these suggestions or it indicates that it cannot produce a reliable answer by providing the list of suggestions.

Figure 3A:
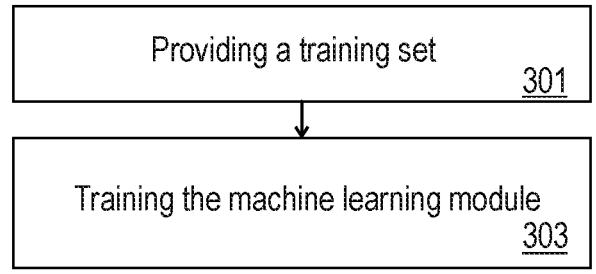
FIG. 3A is a flowchart of training a machine learning module in accordance with an example of the present disclosure.

FIG. 3A is a flowchart of a method for training the machine learning module 106. For exemplification purpose, the machine learning module is described as a clustering algorithm but it is not limited to.

A training set may be provided in step 301. The training set may for example be built during execution of step 207 and/or step 209 of the method of FIG. 2. For example, the training set may be built while the machine learning module is being used in the active mode. In another example, the training set may further be built during the deactivated mode of operation of the machine learning module. The training set may comprise pairs of the machine learning module response and user input. The training set may further comprise pairs of the selected one or more training data items of the set of output data items and the user input.

Figure 3B:
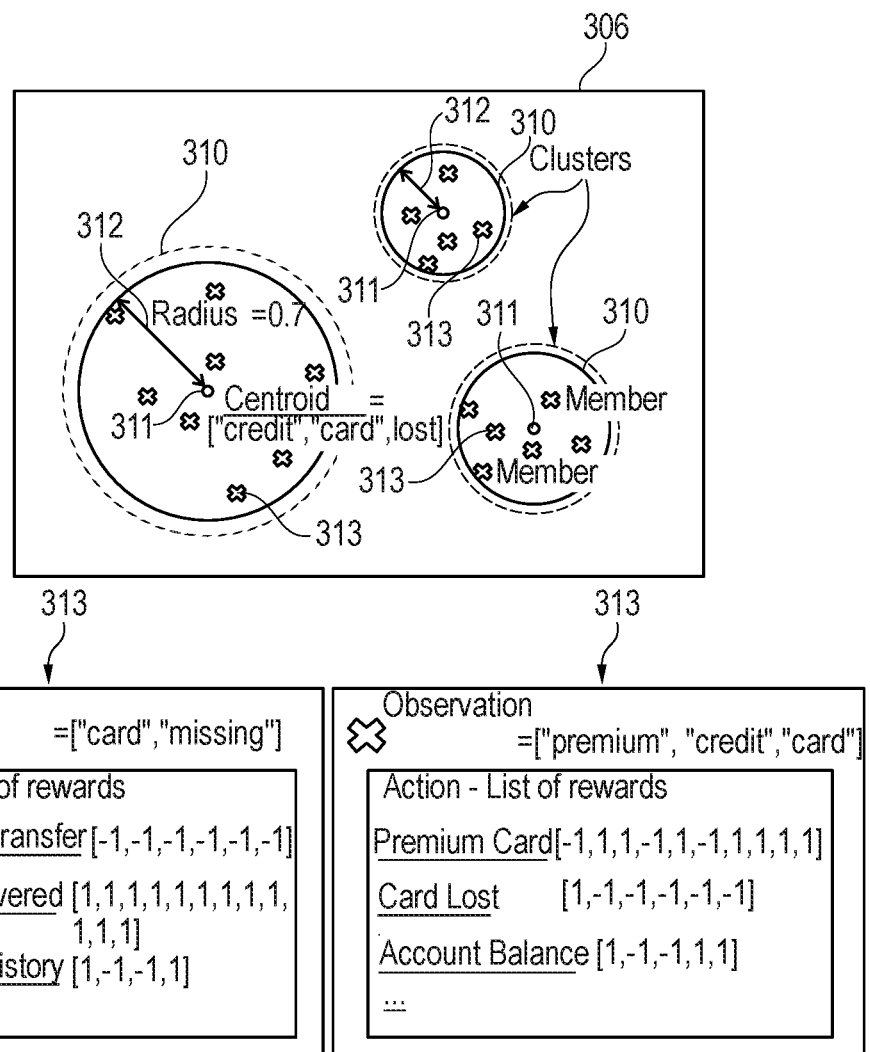
FIG. 3B is a diagram illustrating clusters that result from the training of the machine learning module.

The machine learning module may be trained in step 303 using the training set. The training of the machine learning module results in clusters of the pairs as illustrated in FIG. 3B. FIG. 3B shows example clusters 310 that may result from the training. Each cluster 310 comprises objects (or members) 313. Each object 313 may comprise a pair of user input (named observation) and associated output data items (named actions). Each cluster 310 may have a centroid 311 and a radius 312. The centroid 311 may be a user input.

For example, a member of a cluster may be characterized by its user input and a list/set of output data items-rewards pairs. FIG. 3B shows an example object 313 comprising a user input ["premium", "credit", "card"] and a set of output data items "Premium Card", "Card Lost" and "Account Balance". For example, each output data item of the set is associated with a list of rewards which is a list of real numbers e.g. "Card Lost" is associated with rewards [1, −1, −1, −1, −1, −1]. The rewards are determined from the observed clicks or selections of the user. For example, a data item of the set which has been selected may get a reward +1, and a data item of the set that was provided (e.g. displayed) and not selected may get a reward −1. Thus, the rewards[1, −1, −1, −1, −1, −1] of the data item "Card Lost" indicate that the data item was suggested or provided 6 times but it was selected by the user only one time and was not selected 5 times.

Thus, the machine learning module 306 of FIG. 3B may be described by a set of clusters 310. Each cluster is characterized by its centroid which is an observation e.g. an observation may be ["credit", "card", "lost"], radius which may be a real number e.g. 0.7 and a list of members.

Figure 4A:
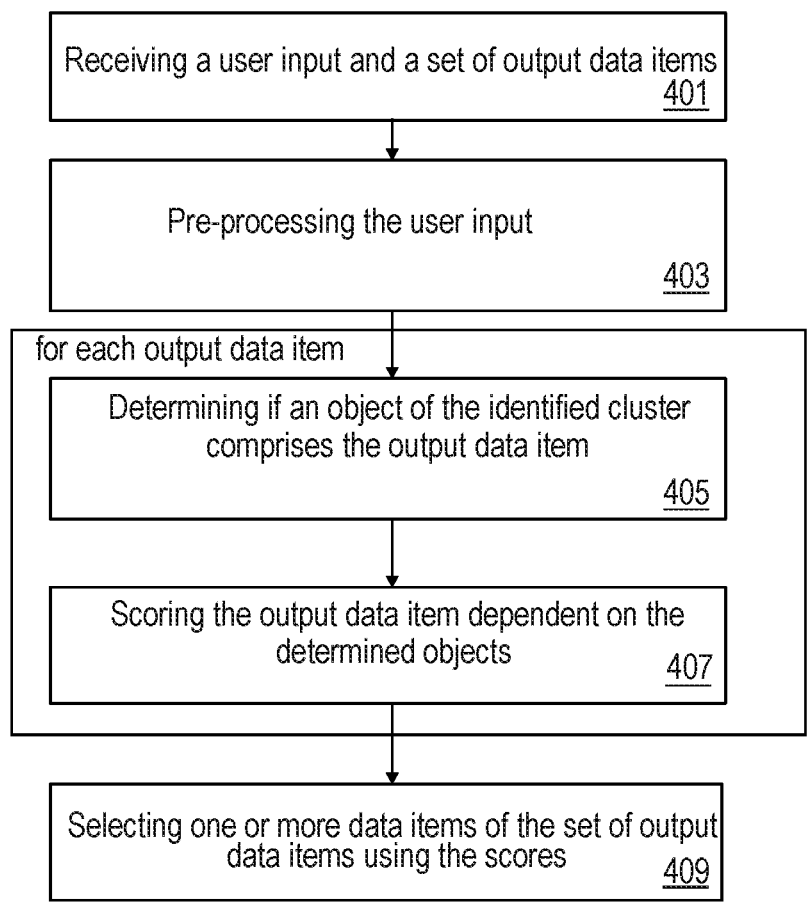
FIG. 4A is a flowchart of a method for estimating a response by a machine learning module in accordance with an example of the present disclosure.

FIG. 4A is a flowchart of a method for estimating a machine learning module response by a machine learning module in accordance with an example of the present disclosure.

For example, the machine learning module may receive a user input and a set of output data items in step 401. The set of output data items may be a dialog system response that is provided by a dialog system in response to the user input. The user input may for example comprise the sentence "I am MISING missing my my credit card" and the set of output data items may comprise two data items "Stolen Card" and "Card Not Delivered".

Figure 4B:
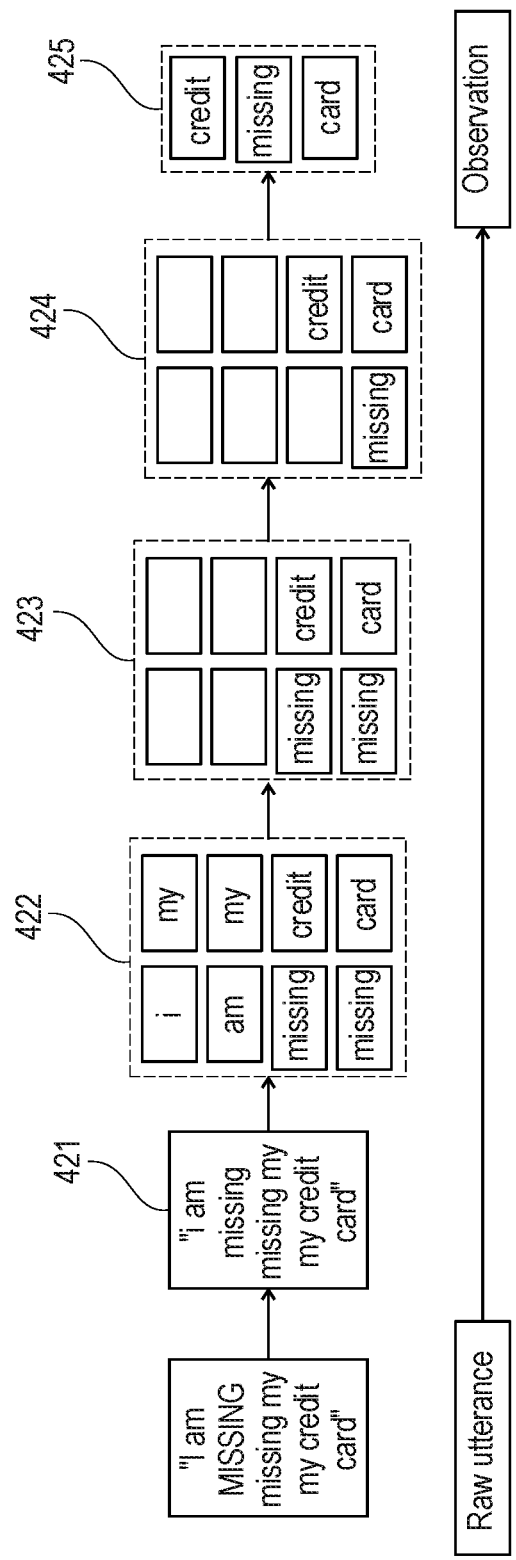
FIG. 4B is a diagram illustrating a preprocessing step of a user input in accordance with an example of the present disclosure.

The user input may be pre-processed in step 403. FIG. 4B shows a diagram illustrating the pre-processing stages of a user input comprising "I am MISING missing my my credit card". In a first stage 421 of the pre-processing the user input may be put to lowercases. The resulting user input may be split into words in the second stage 422 of the pre-processing. The so-called "noise" words like "a", "the", "do", "in" etc. may be removed in the third stage 423 from the words that result from the second stage 422. Duplicates may be removed in the fourth stage 424 from the words of the third stage 423. This may result in a pre-processed user input 425 comprising one or more words.

Figure 4C:
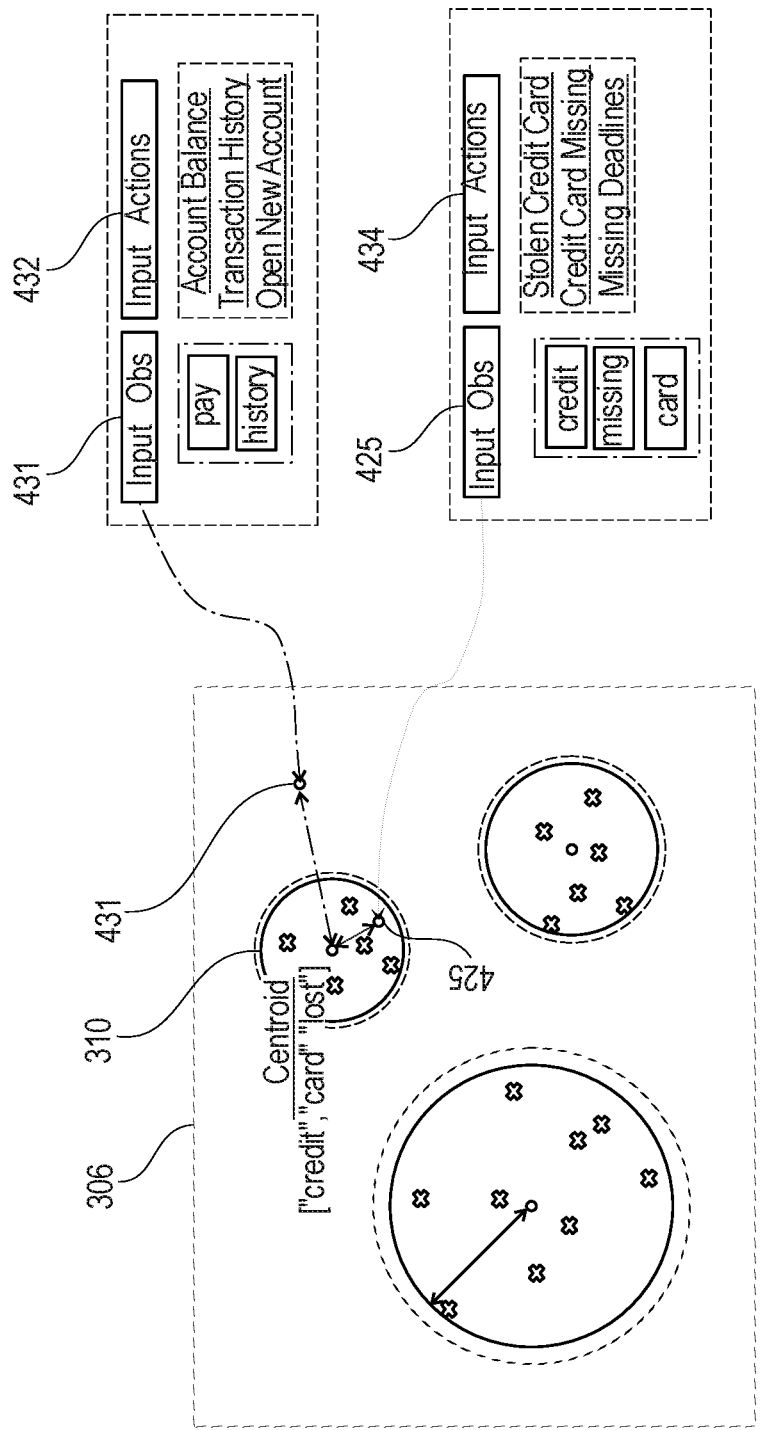
FIG. 4C shows two examples of pre-processed user inputs.

FIG. 4C shows two examples of pre-processed user inputs 431 and 425. The user input 431 comprises words "pay" and "history", and the user input 425 (obtained from FIG. 4B) comprises words "credit", "missing" and "card". As shown in FIG. 4C, each of the user inputs 425 and 431 is associated with its respective set of output data items 434 and 432 e.g. as provided by the dialog system. The set of output data items (referred to as input actions) 432 comprises "Account Balance", "Transaction History" and "Open New Account". The set of output data items (referred to as input actions) 434 comprises "Stolen Credit Card", "Credit Card Missing" and "Missing Deadlines".

A cluster of the clusters 310 that corresponds to the pre-processed user inputs 425 and 431 may be identified. For example, the cluster, whose centroid is the closest to the user input 425 in the Jaccard distance may be identified. The Jaccard distance of two sets A, B may be defined as $1-|A \cap B|/|A \cup B|$. FIG. 4C shows the distances between the two user inputs 425 and 431 and the centroid of the cluster 310 of the machine learning module 306. The centroid of the cluster 310 may be the user input ["credit", "card", "lost"] which is similar to the user input 425. Thus, the user input 425 has a distance to the centroid which is smaller than the radius of the cluster 310, while the distance of the user input 431 to the centroid is higher than the radius.

If the distance of the user input from the centroid of the identified cluster is greater than the radius of the identified cluster, the machine learning module may use the disambiguation feature since it is uncertain about the response. In this case, the set output data items may be provided. If the distance of the user input from the centroid of the identified cluster is smaller than the radius (e.g. the similarity criterion is fulfilled) of the identified cluster, steps 405-409 may be performed. Following the example of FIG. 4C, the disambiguation feature may be used for the user input 431 by displaying the three data items 432. Steps 405-409 may be performed for the user input 425.

For each output data item of the set of output data items steps 405 and 407 may be performed. In step 405, it may be determined if zero or more objects or members of the identified cluster comprises the output data item.

The output data item may be scored in step 407 dependent on the determined zero or more objects. If there is no member in the identified cluster that contains the output data item, a score of 0 may be assigned to the output data item. Otherwise, for each member that does contain the input action, an action's average reward and number of rewards may be calculated for that particular member. If the number of rewards is lower than a predefined threshold, the average reward may be set to 0. The score of the output data item may be calculated as a weighted mean over the members in the cluster that contain that output data item (e.g. the values in the mean are the average rewards and the weights are the numbers of rewards).

The execution of steps 405 and 407 may result in each item of the set of output data items being assigned a score.

In step 409, one or more data items of the set of scored output data items may be selected using the scores. For example, one or more data items having a score higher than a predefined score threshold may be selected. The machine learning module response comprises the one or more selected data items. For example, if the fraction (highest score/max(1, sum of all scores))<some fixed threshold, the model gives a NOT CERTAIN result in accordance with the disambiguation feature. Otherwise it gives the output data item with the highest score as its prediction. The fraction is the ratio of the highest score of the scores of the set output data items and max(1, sum of all scores) is the maximum of 1 and the sum of scores of the set output data items.

Figure 5:
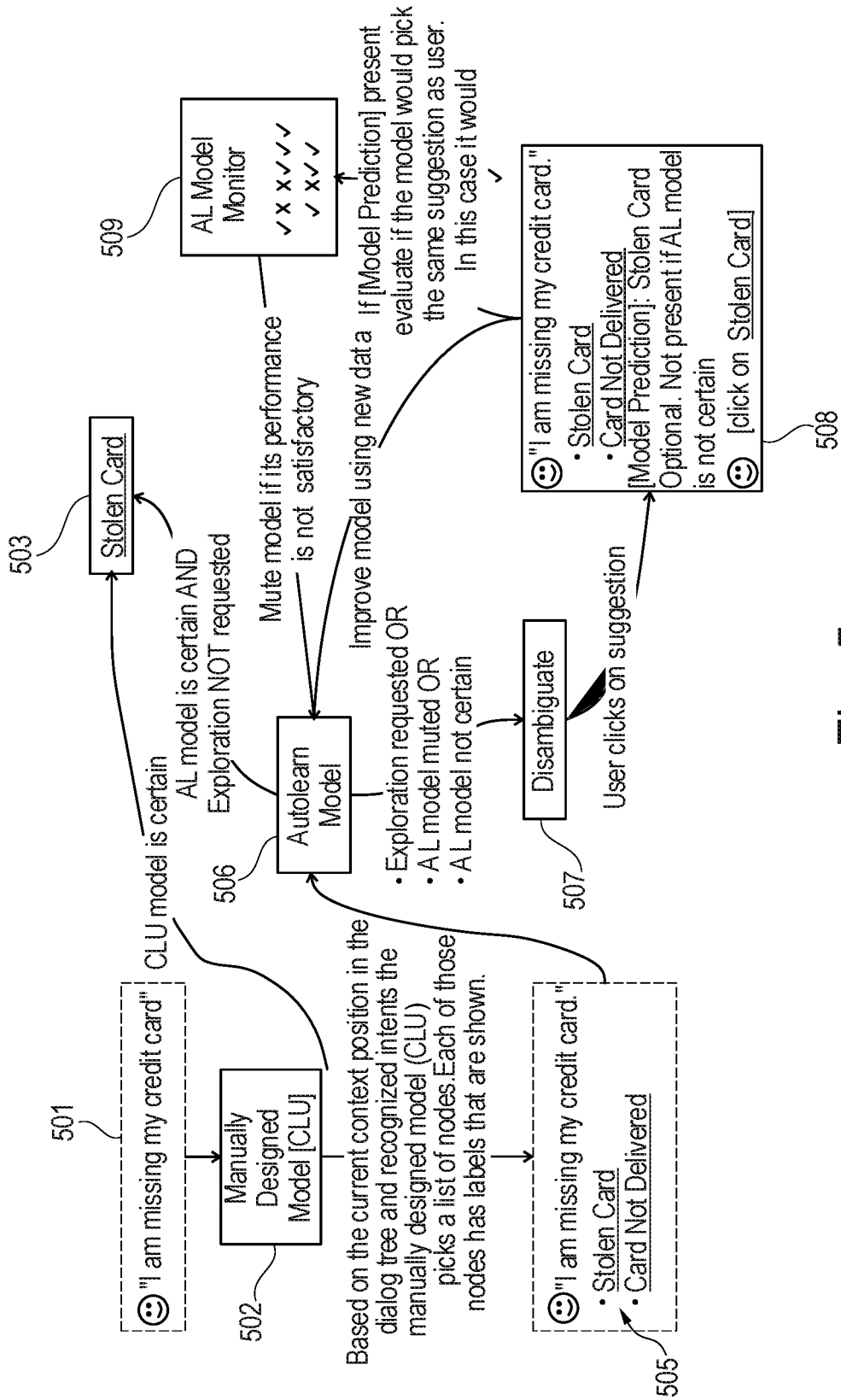
FIG. 5 is diagram illustrating a method for operating a dialog system in accordance with an example of the present disclosure.

FIG. 5 depicts a diagram illustrating a method for operating a dialog system in accordance with an example of the present subject matter.

A user input 501 may be received at a dialog system 502 comprising a manually designated model. Based on the current context, position in the dialog tree of the dialog system and recognized intents, the dialog system may select a list of nodes. Each of these nodes has labels 505 that are shown in FIG. 5 as a set of output data items of a dialog system response. The nodes may be shown if the dialog system is uncertain about the response to the user input 501. If the dialog system 502 is certain about the response it may provide the response 503. In both cases, the first response comprising labels 505 may be input to an auto learn model 506 which is an active mode of operation. If the auto learn model 506, is uncertain about which response to choose from the labels 505, it may run a disambiguation feature 507 so that it displays (508) to the user the labels 505. The user may select one of the labels 505. If the auto learn model 506 is certain about the choice it may select a label and provides it in the response 503.

A model monitor 509 may be used to monitor the activities of the auto learn model 506. The model monitor 509 may determine the accuracy of the responses of the auto learn model 506. Based on the accuracy it may decide to change the operation mode of the auto learn model 506. For example, the auto learn model 506 may be configured to operate in a deactivated mode so that it can further be trained using for example user selections.

Figure 6:
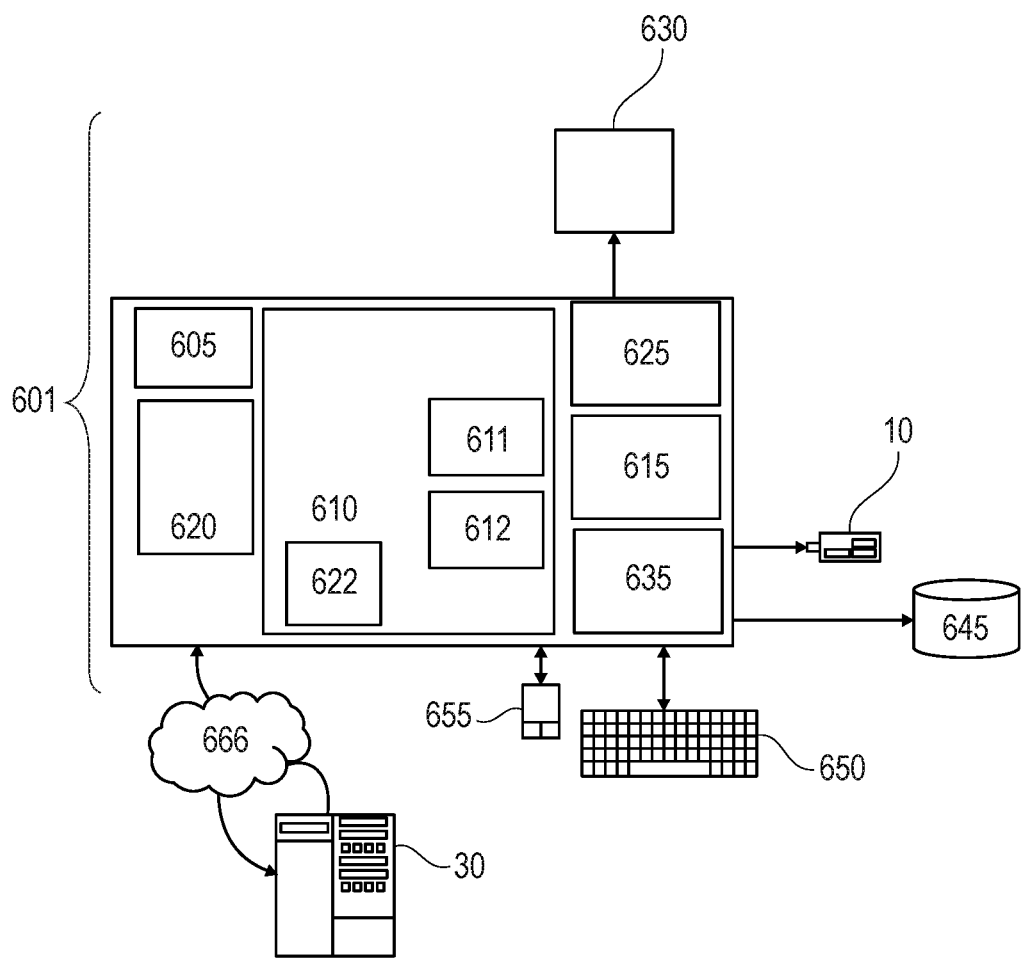
FIG. 6 represents a computerized system, suited for implementing one or more method steps as involved in the present disclosure.

FIG. 6 represents a general computerized system 601, suited for implementing method steps as involved in the present disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software instructions 612, firmware 622, hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system therefore includes a general computerized system 601.

In exemplary embodiments, in terms of hardware architecture, as shown in FIG. 6, the general computerized system 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the general computerized system 601, a semiconductor-based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention.

The software in memory 610 shall also typically include a suitable operating system (OS) 611. The OS 611 essentially controls the execution of other computer programs, such as possibly software instructions 612 for implementing methods as described herein.

The methods described herein may be in the form of a source program, executable program (object code), script, or any other entity comprising a set of software instructions 612 to be performed. When a source program, then the program needs to be translated via a compiler, assembler, interpreter, or the like, which may or may not be included within the memory 610, so as to operate properly in connection with the OS 611. Furthermore, the methods can be written as an object oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The general computerized system 601 can further include a display controller 625 coupled to a display 630. In exemplary embodiments, the general computerized system 601 can further include a network interface for coupling to a network 666. The network 666 can be an IP-based network for communication between the general computerized system 601 and any external server, client and the like via a broadband connection. The network 666 transmits and receives data between the general computerized system 601 and external systems 30, which can be involved to perform part or all of the steps of the methods discussed herein. In exemplary embodiments, network 666 can be a managed IP network administered by a service provider. The network 666 may be implemented in a wireless fashion, e.g., using wireless protocols and technologies, such as WiFi, WiMax, etc. The network 666 can also be a packet-switched network such as a local area network, wide area network, metropolitan area network, Internet network, or other similar type of network environment. The network 666 may be a fixed wireless network, a wireless local area network (LAN), a wireless wide area network (WAN) a personal area network (PAN), a virtual private network (VPN), intranet or other suitable network system and includes equipment for receiving and transmitting signals.

If the general computerized system 601 is a PC, workstation, intelligent device or the like, the software in the memory 610 may further include firmware 622 which may include a basic input output system (BIOS). The BIOS is a set of essential software routines that initialize and test hardware at startup, start the OS 611, and support the transfer of data among the hardware devices. The BIOS is stored in ROM so that the BIOS can be executed when the general computerized system 601 is activated.

When the general computerized system 601 is in operation, the processor 605 is configured to execute software instructions 612 stored within the memory 610, to communicate data to and from the memory 610, and to generally control operations of the general computerized system 601 pursuant to the software. The methods described herein and the OS 611, in whole or in part, but typically the latter, are read by the processor 605, possibly buffered within the processor 605, and then executed.

When the systems and methods described herein are implemented in software instructions 612, as is shown in FIG. 6, the methods can be stored on any computer readable medium, such as storage 620, for use by or in connection with any computer related system or method. The storage 620 may comprise a disk storage such as HDD storage.

In another example, a method for a dialog system is provided. The method comprises: providing a machine learning module, the machine learning module being configured to operate in an active mode and a deactivated mode; receiving a user input at the dialog system; receiving at the machine learning module from the dialog system a dialog system response to the user input, the dialog system response comprising a set of output data items; in response to determining that the machine learning module is in the deactivated mode, using selected one or more training data items of the set of output data items and the user input for training the machine learning module; in response to determining that the machine learning module is in the active mode estimating by the trained machine learning module from the set of output data items and the user input a machine learning module response to the user input; providing the machine learning module response if it is estimated or providing the dialog system response if no estimation is performed.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a dialog system, wherein the dialog system comprises a machine learning module configured to operate in an active mode and a deactivated mode, the method comprising: receiving a user input at the dialog system; receiving at the machine learning module from the dialog system a dialog system response to the user input, the dialog system response comprising a set of output data items; in response to determining that the machine learning module is in the deactivated mode, using selected one or more training data items of the set of output data items and the user input for training the machine learning module; in response to determining that the machine learning module is in the active mode, estimating, by the trained machine learning module from the set of output data items and the user input, a machine learning module response to the user input; providing the machine learning module response in the active mode or the dialog system response in the deactivated mode; and building a training set, wherein the building comprises adding a pair further comprising the machine learning module response and user input, to the training set in the active mode, and wherein the building comprises adding the selected one or more training data items of the set of output data items and the user input to the training set in the deactivated mode, and wherein the training of the machine learning module is performed using the training set.

2. The method of claim 1, further comprising: switching from the deactivated mode to the active mode in response to determining that the machine learning module is trained with a minimum amount of data and/or estimations of the machine learning module have an accuracy higher than a predefined threshold.

3. The method of claim 1, further comprising: switching from the active mode to the deactivated mode in response to determining that estimations of the machine learning module have an accuracy smaller than a predefined threshold or for further training the machine learning module.

4. The method of claim 3, further comprising, for each received user input of a set of test user inputs: estimating by the machine learning module a machine learning module test response to the user input; determining by the dialog system a dialog system test response to the user input; comparing the machine learning module test response with a user selected output data item of the dialog system test response; and determining the accuracy based on a set of comparison results.

5. The method of claim 1, further comprising: in case the set of output data items comprises more than one data item, receiving from the user a selection of the one or more training data items, wherein in case the set of output data items comprises a single data item, the selection comprises the single data item.

6. The method of claim 1, wherein the estimating comprises using the user input for selecting a data item of the set of output data items or ranking the set of output data items, and wherein the machine learning module response comprises the selected data item or the ranked data items.

7. The method of claim 1, wherein the using of the selected one or more training data items of the set of output data items and the user input for training the machine learning module is performed in response to the selected one or more training data items being previously selected a number of times for the user input.

8. The method of claim 1, wherein the training of the machine learning module is performed if the training set has a minimum number of pairs.

9. The method of claim 1, further comprising: performing a text pre-processing of the user input, the text pre-processing comprising at least changing a format of the user input.

10. The method of claim 1, wherein the machine learning module comprises a clustering algorithm, and wherein the training of the machine learning module results in clusters of pairs.

11. The method of claim 10, wherein the estimating further comprises: identifying a cluster of the clusters that corresponds to the user input; for each output data item of the set of output data items, determining if an object of the identified cluster comprises the output data item, the object being a pair of the cluster; scoring the output data item dependent on the determined objects; and selecting one or more data items of the set of output data items having a score higher than a predefined score threshold, wherein the machine learning module response comprises the selected one or more data items.

12. The method of claim 11, wherein the identifying comprises determining a similarity value indicative of a similarity between the user input and a centroid object of each cluster of the clusters, and wherein the cluster corresponding to the user input is the cluster having the similarity value fulfilling a similarity criterion.

13. The method of claim 12, the similarity value being a Jaccard distance between the user input and the centroid object.

14. The method of claim 11, wherein in case that no cluster of the clusters corresponds to the user input, the machine learning module response comprises the set of output data items.

15. The method of claim 1, wherein the dialog system provides the result of the user input using a dialogue tree.

16. The method of claim 1, wherein the user input is a text input and/or speech input.

17. A computer program product comprising: a non-transitory computer readable storage medium having program instructions embodied therewith, the program instructions executable by a computer system to cause the computer system to perform a method for a dialog system, wherein the dialog system comprises a machine learning module configured to operate in an active mode and a deactivated mode, the method comprising: receiving a user input at the dialog system; receiving at the machine learning module from the dialog system a dialog system response to the user input, the dialog system response comprising a set of output data items; in response to determining that the machine learning module is in the deactivated mode, using selected one or more training data items of the set of output data items and the user input for training the machine learning module; in response to determining that the machine learning module is in the active mode, estimating, by the trained machine learning module from the set of output data items and the user input, a machine learning module response to the user input; providing the machine learning module response in the active mode or the dialog system response in the deactivated mode; and building a training set, wherein the building comprises adding a pair further comprising the machine learning module response and user input, to the training set in the active mode, and wherein the building comprises adding the selected one or more training data items of the set of output data items and the user input to the training set in the deactivated mode, and wherein the training of the machine learning module is performed using the training set.

18. A dialog learning module for a dialog system, the dialog learning module being configured for: receiving from the dialog system a dialog system response to a user input, the dialog system response comprising a set of output data items; in response to determining that the machine learning module is in the deactivated mode, using selected one or more data items of the set of output data items and the user input for training the machine learning module; in response to determining that the machine learning module is in the active mode, estimating, by the trained machine learning module from the set of output data items and the user input, a machine learning module response to the user input; providing the machine learning module response or the dialog system response; and building a training set, wherein the building comprises adding a pair; further comprising the machine learning module response and user input, to the training set in the active mode, and wherein the building comprises adding the selected one or more training data items of the set of output data items and the user input to the training set in the deactivated mode, and wherein the training of the machine learning module is performed using the training set.

* * * * *